(12) United States Patent  (10) Patent No.: US 8,156,521 B2
Ikeguchi et al.  (45) Date of Patent: Apr. 10, 2012

(54) RECEIVER

(75) Inventors: Yasuyuki Ikeguchi, Hyogo (JP); Tatsuya Hosomi, Hyogo (JP); Toru Shibusawa, Osaka (JP); Hirotsugu Murashima, Nara (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1522 days.

(21) Appl. No.: 11/169,296

(22) Filed: Jun. 29, 2005

(65) Prior Publication Data

US 2006/0050177 A1    Mar. 9, 2006

(30) Foreign Application Priority Data

Jul. 1, 2004    (JP) ................................. 2004-195113

(51) Int. Cl.
    *G06F 3/00*    (2006.01)
(52) U.S. Cl. ........................................................ 725/37
(58) Field of Classification Search ................... 725/52, 725/39
    See application file for complete search history.

(56) References Cited

U.S. PATENT DOCUMENTS

| | | | | |
|---|---|---|---|---|
| 5,187,735 A * | 2/1993 | Herrero Garcia et al. | . | 379/88.17 |
| 5,931,905 A * | 8/1999 | Hashimoto et al. | ........... | 709/217 |
| 6,618,858 B1 * | 9/2003 | Gautier | ......................... | 725/132 |
| 6,762,773 B2 * | 7/2004 | Kolde et al. | .................... | 715/716 |
| 6,978,473 B1 * | 12/2005 | Nsonwu et al. | ................. | 725/52 |
| 7,006,609 B2 * | 2/2006 | Cloutier et al. | ............. | 379/88.23 |
| 7,092,992 B1 * | 8/2006 | Yu | ................................... | 709/206 |
| 7,162,475 B2 * | 1/2007 | Ackerman | ............................. | 1/1 |
| 7,216,107 B2 * | 5/2007 | Adachi et al. | .................... | 705/50 |
| 7,360,236 B2 * | 4/2008 | Terasaki | ....................... | 725/146 |
| 7,415,717 B1 * | 8/2008 | Nagumo | ........................ | 725/137 |
| 7,447,740 B2 * | 11/2008 | AbiEzzi et al. | ................ | 709/204 |
| 7,571,458 B1 * | 8/2009 | Eyal | ................................. | 725/137 |
| 7,669,218 B1 * | 2/2010 | Groff et al. | ....................... | 725/50 |
| 2002/0104095 A1 * | 8/2002 | Nguyen et al. | .................. | 725/110 |
| 2002/0120869 A1 * | 8/2002 | Engstrom | ....................... | 713/201 |
| 2002/0147988 A1 * | 10/2002 | Nakano | ........................... | 725/134 |
| 2003/0074660 A1 * | 4/2003 | McCormack et al. | ............. | 725/2 |
| 2003/0115462 A1 * | 6/2003 | Kim et al. | ....................... | 713/170 |
| 2003/0135740 A1 * | 7/2003 | Talmor et al. | .................. | 713/186 |
| 2003/0187775 A1 * | 10/2003 | Du et al. | .......................... | 705/37 |
| 2003/0224760 A1 * | 12/2003 | Day | ............................ | 455/412.1 |
| 2003/0237093 A1 * | 12/2003 | Marsh | ............................ | 725/46 |
| 2004/0254995 A1 * | 12/2004 | Oka et al. | ....................... | 709/206 |
| 2005/0064850 A1 * | 3/2005 | Irlam et al. | .................. | 455/414.1 |
| 2005/0081244 A1 * | 4/2005 | Barrett et al. | .................... | 725/97 |
| 2005/0144635 A1 * | 6/2005 | Boortz | ............................ | 725/32 |
| 2005/0240959 A1 * | 10/2005 | Kuhn et al. | ...................... | 725/25 |
| 2007/0124763 A1 * | 5/2007 | Ellis | ................................ | 725/35 |

* cited by examiner

*Primary Examiner* — Brian Pendleton
*Assistant Examiner* — Jonathan V Lewis
(74) *Attorney, Agent, or Firm* — Kratz, Quintos & Hanson, LLP

(57) ABSTRACT

A receiver has a tuner for receiving a TV broadcast program and a modem for receiving an e-mail. Also, the receiver outputs a message if there exists any unopened e-mail. In addition, the receiver has a camera for sending a videophone image. A viewer in front of the receiver is recognized, and it is determined whether or not the recognized viewer matches the addressee of the unopened e-mail. If a result of the determination is negative, a message output operation is prohibited.

12 Claims, 5 Drawing Sheets

(A)

EXAMPLE OF SCREEN WITH
NOTIFICATION OF NEW INCOMING MAIL (B)

EXAMPLE OF SCREEN WITH
NOTIFICATION OF UNREAD MAIL

FIG. 3
<u>32d</u>
|   | ADDRESSEE | MAIL |
|---|---|---|
| 1 | A | NEW |
| 2 | A | UNREAD |
| 3 | A | READ |
| 4 | B | NEW |
| 5 | B | READ |
| 6 | C | NEW |
FIG. 4
(A)
EXAMPLE OF SCREEN WITH
NOTIFICATION OF NEW INCOMING MAIL
(B)
EXAMPLE OF SCREEN WITH
NOTIFICATION OF UNREAD MAIL

RECEIVER

BACKGROUND OF THE INVENTION

1. Field of the Invention

The present invention relates to a receiver. More specifically, the present invention relates to a receiver that applies to a videophone-capable TV receiver and that has a program reception function of receiving a broadcast program and an e-mail reception function of receiving an e-mail.

2. Description of the Prior Art

For example, according to the e-mail capabilities of personal computers, cellular phones or Internet TVs, when a new mail has been received, an incoming message is provided.

In cases of a conventional personal computer or cellular phone, a user uses such a device all by himself, and most of applications and contents are offered in the form of still images. Thus, no matter when a notification of an incoming mail is provided, it is seldom that the user is hindered from using the device. On the other hand, in cases of a mail service with Internet TV, there may exist a plurality of viewers and, if a notification of an incoming mail for one of the viewers is given when they are viewing the TV, this may be a hindrance to the other viewers' viewing.

SUMMARY OF THE INVENTION

Therefore, it is a primary object of the present invention to provide a novel receiver.

It is another object of the present invention to provide a receiver that makes it possible to, when a notification of an incoming mail is provided during program viewing, prevent the viewing from being hindered.

A receiver according to the present invention of claim 1 is a receiver with a program reception function of receiving a broadcast program and a mail reception function of receiving an e-mail, comprises: a message outputter for outputting a message when there exists an unopened e-mail that is received by means of the mail reception function and is not yet opened; a recognizer for recognizing a viewer of the broadcast program received by means of the program reception function; a determiner for determining whether or not the viewer recognized by the recognizer matches an addressee of the unopened e-mail; and a prohibitor for prohibiting the message outputter from performing an output operation when the result of determination by the determiner is negative.

The receiver has the program reception function of receiving a broadcast program and the mail reception function of receiving an e-mail. The message outputter outputs a message when there exists an unopened e-mail that is received by means of the mail reception function and is not yet opened. The recognizer recognizes the viewer of the broadcast program received by means of the program reception function. The determiner determines whether or not the viewer recognized by the identifier matches the addressee of the unopened e-mail. The prohibitor prohibits the message outputter from performing an output operation when the result of determination by the determiner is negative.

By prohibiting the output of a message when the viewer does not match the addressee of an unopened e-mail, it is possible to prevent program viewing from being disturbed.

A receiver according to the present invention of claim 2 depends on claim 1 and further comprises a first permitter that permits the message outputter to perform an output operation in particular timing according to a status of reception by means of the program reception function when the result of determination by the determiner is positive.

A receiver according to the present invention of claim 3 depends on claim 2, wherein the broadcast program contains CMs on an intermittent basis, and the particular timing includes timing that belongs to a time period of broadcasting the CMs. This makes it possible to notify the viewer of the presence of the unopened e-mail as promptly as possible, without a hindrance to his viewing of the broadcast program.

A receiver according to the present invention of claim 4 depends on claim 2, wherein one of a plurality of broadcast programs offered through a plurality of channels, respectively, is received by means of the program reception function, and the particular timing includes timing in which a channel change operation is performed. This makes it possible, as in the above description, to notify the viewer of the presence of the unopened e-mail as promptly as possible, without a hindrance to his viewing of the broadcast program.

A receiver according to the present invention of claim 5 depends on claim 4, wherein the particular timing further includes timing in which length of time during which the same channel is continuously selected has reached a threshold value. If the time until the threshold value has been reached is long, a hindrance to his viewing is reduced to a minimum, which makes it possible, as in the above description, to notify the viewer of the presence of the unopened e-mail.

A receiver according to the present invention of claim 6 depends on claim 1, wherein, upon reception of the new e-mail, the determiner makes a determination.

A receiver according to the present invention of claim 7 depends on claim 1, wherein, upon acceptance of an ON operation of turning on the program reception function, the determiner makes a determination. At the instant of power-on, the viewer has not yet seen a message. In addition, by prohibiting the output of a message when the viewer does not match the addressee of the unopened e-mail, it is possible to prevent his viewing from being hindered.

A receiver according to the present invention of claim 8 depends on claim 1, further comprises a second permitter that, upon acceptance of an OFF operation of turning off the program reception function, permits the message outputter to perform an output operation regardless of the result of determination by the determiner. The viewer's turning off the power means that he intends to stop his viewing, and thus outputting a message at that time would not lead to a hindrance to his viewing.

A receiver according to the present invention of claim 9 depends on claim 1, further comprises a storage that stores information on characteristics of a plurality of persons as candidates for the addressee, wherein the recognizer includes an extractor that extracts information on characteristics of the viewer, and an identifier that identifies the viewer by a comparison between the characteristics information stored in the storage and the characteristics information extracted by the extractor.

According to the present invention, by prohibiting the output of a message when the viewer does not match the addressee of the unopened e-mail, it is possible to prevent his viewing from being hindered.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing one example of structure of a register;

FIG. 4 is an illustrative view showing one example of a reading information message;

DETAILED DESCRIPTION OF THE PREFERRED EMBODIMENTS

Figure 1:
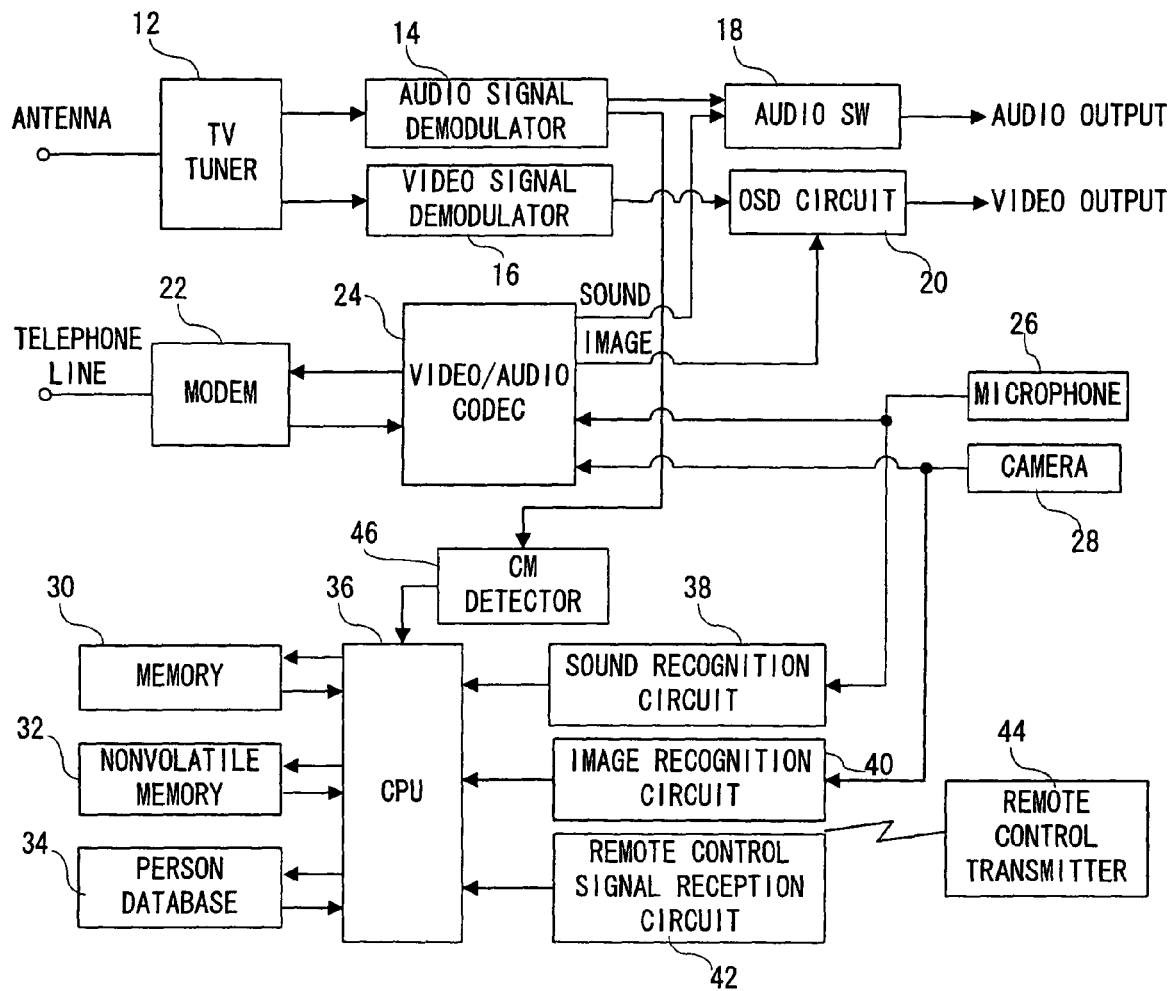
FIG. 1 is a block diagram showing an embodiment of the present invention.

Referring to FIG. 1, a videophone-capable TV receiver 10 of this embodiment includes a TV tuner 12. The TV tuner 12 is connected to an antenna for receiving TV broadcasts, and receives an arbitrary broadcast wave. An audio signal demodulator 14 demodulates a TV broadcast wave to a TV audio signal. An audio switch 18 selects either a TV audio signal or a videophone audio signal, or synthesizes the two, and then outputs the selected signal or the synthesized signal to a speaker, etc.

A video signal demodulator 16 demodulates a TV broadcast wave to a video signal. An OSD circuit 20 generates a video signal based on an e-mail, synthesizes the generated video signal and the demodulated video signal, and then outputs the synthesized video signal to a display apparatus such as CRT.

A modem 22 converts an electrical signal sent via a telephone line into digital data. It also converts digital data into an electrical signal, and passes the converted electrical signal to the telephone line. The digital data corresponds to sound, image or e-mail. A CODEC (COder DECoder) 24 converts the digital data corresponding to sound or image into analog data, or converts analog data into digital data in reverse.

A microphone 26 is an audio signal input apparatus for sending a videophone speech. A camera 28 is an image input apparatus for sending a videophone image.

A CPU 36 controls entire operation of the videophone-capable TV receiver 10. A memory 30 is a storage apparatus for operating the CPU 36. A remote control transmitter 44 is a remote control transmitter for operating the videophone-capable TV receiver 10, and is used for power-on and off, TV channel selection, and various setting operations. A remote control signal reception circuit 42 receives an operational signal from the remote control transmitter 44 and provides the CPU 36 with operational information.

A CM detector 46 detects a monophonic TV audio signal from the audio signal demodulator 14 and passes it to the CPU 36. When the detection of the monophonic TV audio signal is informed, the CPU 36 determines that a CM is being broadcast on TV.

A person database 34 is composed of nonvolatile memory, etc. By registering in advance individuals' personal voice data and personal image data into the database, a personal identification function becomes enabled.

By means of the remote control transmitter 44, a user setting menu is called up to enter the registration mode. After a user name is designated, the user's voice is registered. The user's voice is input from the microphone 26 to an audio recognition circuit 38, and converted into data on the characteristics of the user. The converted data is saved as voice reference data for the user in the person database 34. Elements of the data on the user's characteristics include an audio frequency spectrum, etc.

In a similar manner, an image of the user is registered. The image of the user is input from the camera 28 to an image recognition circuit 40, and converted into data on the characteristics of the user. The converted data is saved as image reference data for the user in the person database 34. Elements of the data on the user's characteristics include face line, complexion, positional relationships among eyes, nose and mouth, body frame, usual sitting position in viewing a TV, etc. Moreover, all the users who use the videophone-capable TV receiver 10 are registered.

While the videophone-capable TV receiver 10 is powered on, the CPU 36 continues monitoring to see who of the registered users is in front of the videophone-capable TV receiver 10. The CPU 36 obtains data from the audio recognition circuit 38 and the image recognition circuit 40 on a regular basis, and compares the obtained data to the data in the person database 34. If this has revealed that the obtained data matches any piece of the data in the person database 34, the identifier of the user corresponding to the matched piece of data is saved on the nonvolatile memory 32. For the time cycle of the comparison, ten-odd seconds to several tens of seconds are sufficient in terms of the sense of time relative to human's action.

Personal identification can be performed with higher accuracy because the determination is made on the two kinds of data, voice and image, and the target is limited to the users registered in the person database 34.

A description is given below as to operation at a time when an incoming e-mail is received during TV viewing.

Figure 2:
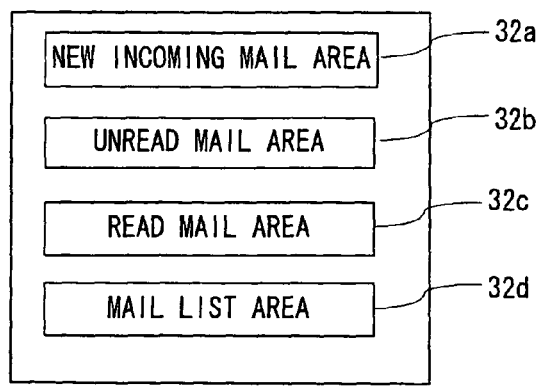
FIG. 2 is an illustrative view showing areas of a memory.

If a user corresponding to the addressee of the e-mail exists in front of the videophone-capable TV receiver 10, the CPU 36 provides the user with a notification of an incoming e-mail by displaying a message as shown in FIG. 4(A) through the OSD circuit 20. At the same time, the CPU 36 may output a sound for the notification through the audio switch 18. By setting a mail reading mode, the user can read the mail immediately. The read mail is saved in a read mail area 32c of the nonvolatile memory 32 shown in FIG. 2. If the user does not intend to read the mail immediately, the mail is saved in an unread mail area 32b of the nonvolatile memory 32 shown in FIG. 2.

If no user corresponding to the addressee of an e-mail exists in front of the videophone-capable TV receiver 10, the CPU 36 withholds an operation of making a notification of the incoming mail. After that, when the CPU 36 has recognized the corresponding user has appeared in front of the videophone-capable TV receiver 10, the CPU 36 provides the notification.

Notification of an incoming mail is carried out in timing that does not hinder TV viewing. For example, the notification is given when the TV channel is changed (hereinafter referred to as channel detection notification), or the notification is provided when a CM is being broadcast (hereinafter referred to as CM detection notification). The channel detection notification is provided when the CPU 36 has recognized that the channel is changed. The CM detection notification is provided when the CPU 36 has recognized that a CM is being broadcast on TV. Besides, the user can select at his option by making a setting in advance whether or not to enable these detection notifications.

Figure 5:
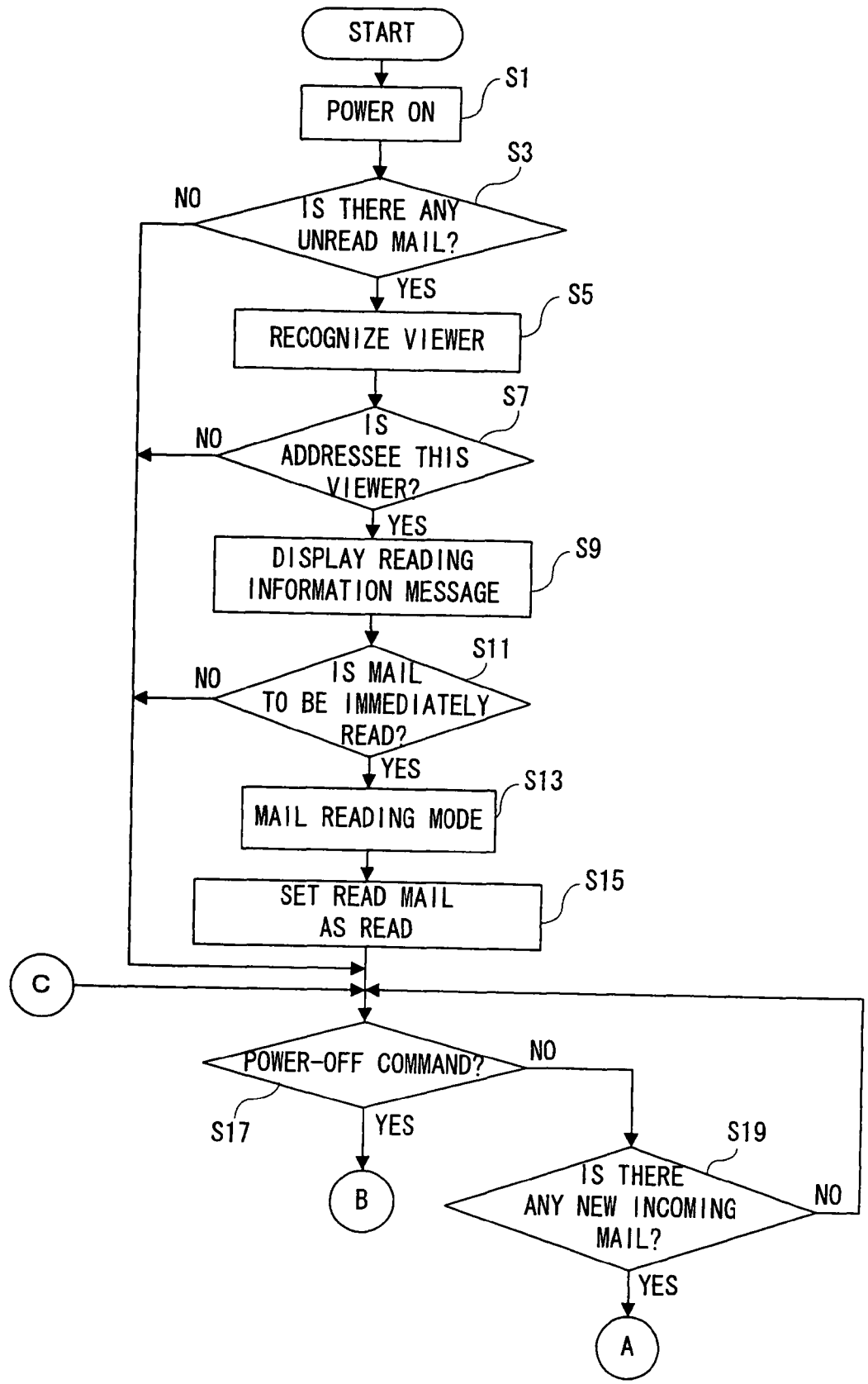
FIG. 5 is a flowchart showing a part of operation of the FIG. 1 embodiment.
Figure 6:
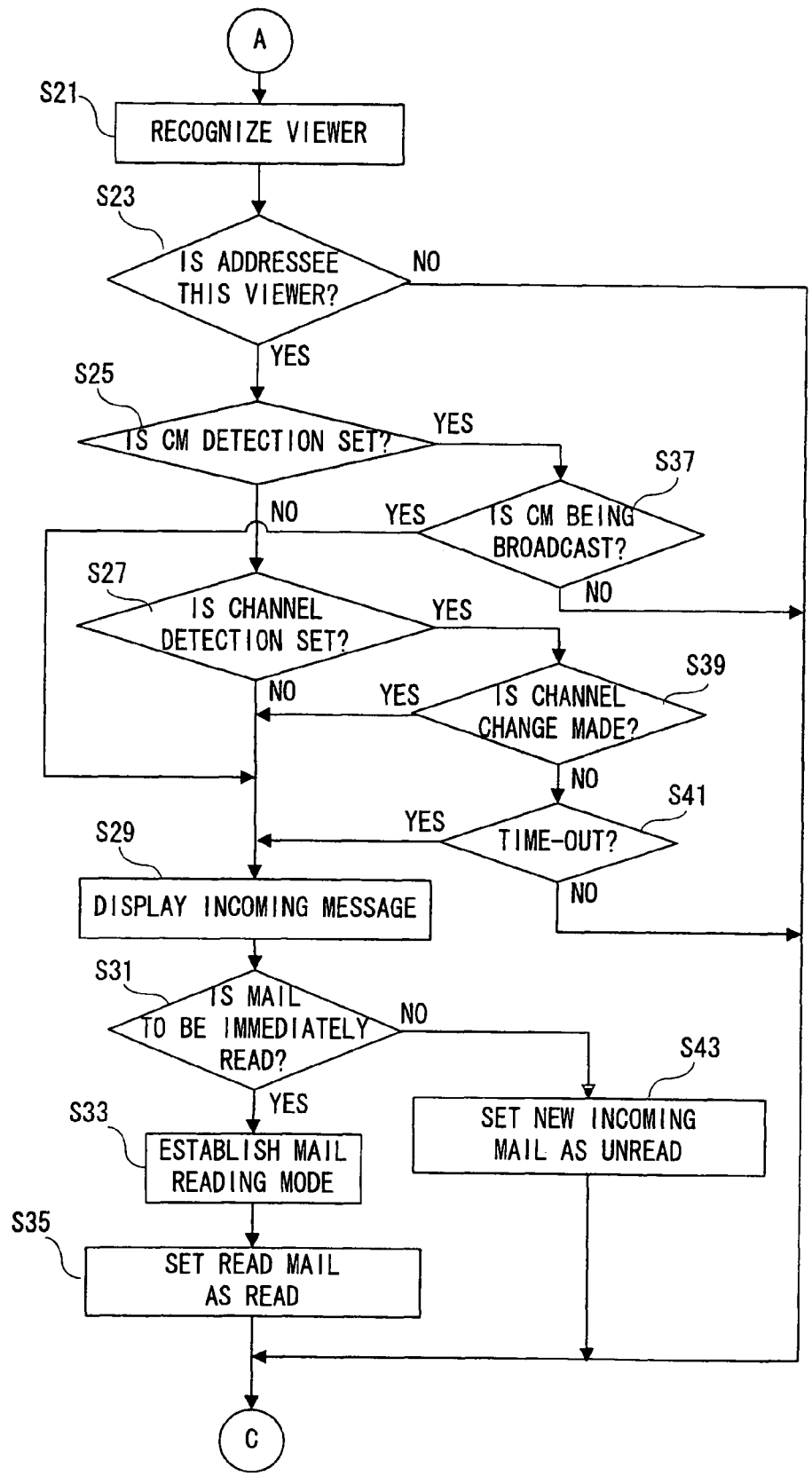
FIG. 6 is a flowchart showing a part of operation of the FIG. 1 embodiment.
Figure 7:
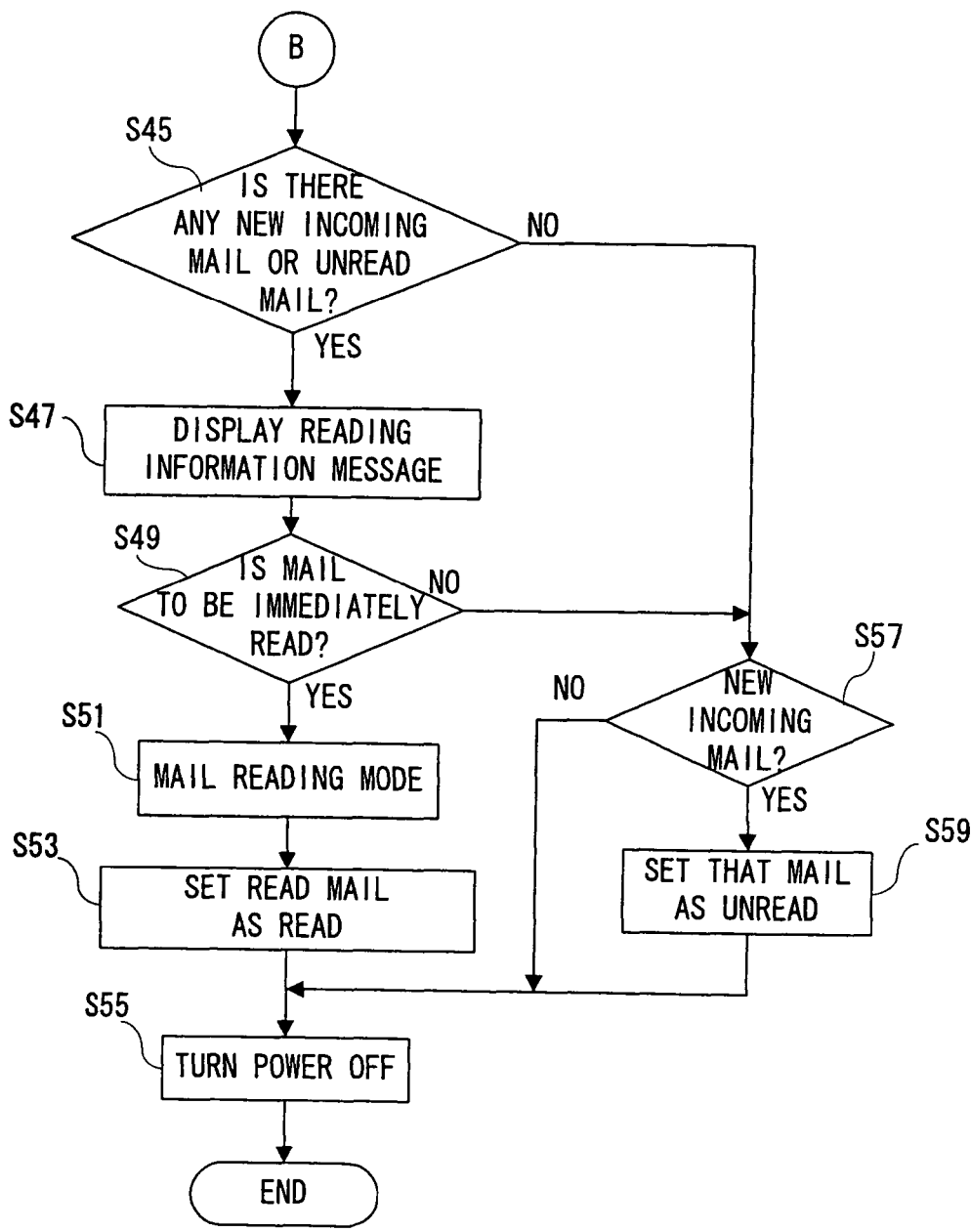
FIG. 7 is a flowchart showing a part of operation of the FIG. 1 embodiment.

The CPU 36 executes control programs shown in FIGS. 5 to 7. These control programs are stored in the nonvolatile memory 32.

Firstly, referring to FIG. 5, the videophone-capable TV receiver 10 is powered on in a step S1, and it is determined in a step S3 whether or not there exists any unread mail. If YES, the CPU 36 recognizes a viewer(s) in a step S5. It is determined in a step S7 whether or not there exists the addressee of the unread mail among the recognized viewer(s) and, if YES, a reading information message is displayed in a step S9 as shown in FIG. 4(B).

It is determined in a step S11 whether or not the viewer intends to immediately read the unread mail with the information message. If YES, the mail reading mode is established in a step S13, which allows the viewer to read the mail saved in the unread mail area 32b of the nonvolatile memory 32 (see FIG. 2).

The read mail is moved from the unread mail area 32b to the read mail area 32c of the nonvolatile memory 32, and set as a read mail in the register of a mail list area 32d (see FIG. 3) in a step S15. In this manner, by providing an information message for a unread mail at a time of start-up before TV viewing, it is possible to prompt the user to read the mail without a hindrance to his viewing.

Then, the process proceeds to a step S17 to determine whether a power-off command is input or not. If YES, the process goes to a step S45. Referring to FIG. 7, it is determined in the step S45 whether or not there exists any new incoming mail or unread mail. If YES, a reading information message is displayed in a step S47 as shown in FIG. 4(A) or FIG. 4(B).

It is determined in the step S49 whether or not the viewer intends to immediately read the mail as subject of the information message. If YES, the mail reading mode is established in a step S51, which allows the viewer to read the mail saved in the new incoming mail area 32a or the unread mail area 32b of the nonvolatile memory 32 (see FIG. 2).

The read mail is moved from the unread mail area 32b to the read mail area 32c of the nonvolatile memory 32, and set as a read mail in the register of a mail list area 32d (see FIG. 3).

It is determined in a step S57 whether or not there exists any new incoming mail. If YES, the new incoming mail is moved from the new incoming mail area 32a to the unread mail area 32c of the nonvolatile memory 32, and set as an unread mail in the register of the mail list area 32d.

After the setting into the register, the process proceeds to a step S55 to turn the power off. When the power is being turned off, a notification of the incoming mail is provided to the viewer, regardless of whether he is the addressee or not. This is because outputting a message when the viewer is going to stop viewing will never lead to a hindrance to his viewing.

Returning to FIG. 5, it is determined in a step S19 whether or not there exists any new incoming mail and, if YES, the process goes to a step S21. Referring to FIG. 6, the CPU 36 recognizes a viewer(s). It is determined in a step S23 whether or not there exists the addressee of the mail among the recognized viewer(s).

If YES, it is determined in a step S25 whether the CM detection setting is enabled or not. If YES, it is determined in a step S37 whether a CM is being broadcast or not. If YES, an incoming message is displayed in a step S29, as shown in FIG. 4(A).

It is determined in a step S27 whether the channel detection setting is enabled or not. If YES, it is determined in a step S39 whether a channel change has been carried out or not. If NO, it is determined in a step S41 whether a timeout has occurred or not. If no channel change is carried out even after lapse of a predetermined time, this is determined as a timeout. If YES in the step S41, the process proceeds to the step S29.

If NO in the step S23 or NO in the step S37 or NO in the step S41, the process moves to the step S17. In addition, if NO in the step S27 or YES in the step S39, the process goes to the step S29.

In a step S31, it is determined whether or not the addressee intends to immediately read the mail as subject of the information message. If YES, the mail reading mode is established in a step S33, which allows the addressee to read the mail saved in the new incoming mail area 32a of the nonvolatile memory 32a (see FIG. 2).

The read mail is moved from the new incoming mail area 32a to the read mail area 32c of the nonvolatile memory 32 in a step S35, and set as a read mail in the register of the mail list area 32d (see FIG. 3).

If it is determined in the step S31 that the addressee does not intend to immediately read the mail, the mail is moved from the new incoming mail area 32a to the unread mail area 32b of the nonvolatile memory 32 in a step S45, and set as an unread mail in the register of the mail list area 32d. After setting into the register, the process goes to the step S17.

As understood from the above description, the videophone-capable TV receiver 10 has the TV tuner 12 for receiving a TV broadcast program and the modem 22 for receiving an e-mail. Also, if there exists any unopened e-mail, the videophone-capable TV receiver 10 outputs a reading information message. In addition, the videophone-capable TV receiver 10 has the microphone 26 for sending a videophone speech and the camera 28 for sending a videophone image.

Here, the CPU 36 recognizes the viewer(s) in front of the videophone-capable TV receiver 10, and determines whether or not one of the recognized viewer(s) matches the addressee of the unopened e-mail. Then, if the result of determination is negative, the CPU 36 prohibits the message outputter from performing an output operation.

If the viewer does not match the addressee of the unopened e-mail, by prohibiting the output of a message for the unopened e-mail, it is possible to prevent his viewing from being hindered. Moreover, by outputting a message in timing in which a CM is being broadcast or a channel change is carried out, it is possible to avoid a hindrance to his viewing, even at a time of outputting the message.

Besides, a radio or car navigation system may be employed as receiver.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A videophone-capable television receiver with a television program reception function of receiving a television broadcast program and a mail reception function of receiving an e-mail, comprising:

a message outputter which outputs a message when there exists an unopened e-mail that is received by said mail reception function and is not yet opened;

an inputter that inputs at least one of a voice and an image of a viewer of the television broadcast program received by said television program reception function; wherein the inputter comprises a microphone for sending a videophone speech and a camera for sending a videophone image;

a determiner which determines, based on at least one of the voice and the image of the viewer input by said inputter, whether or not the viewer matches an addressee of said unopened e-mail; and a prohibitor which prohibits said message outputter from performing an output operation at any time when a result of determination by said determiner is negative, while prohibiting said message outputter from performing an output operation at a time that hinders said addressee from viewing the television broadcast program received by said television program reception function, when a result of determination by said determiner is positive.

2. The videophone-capable television receiver according to claim 1, further comprising a first permitter that permits said message outputter to perform an output operation in particular timing according to a status of reception by said television program reception function when the result of determination by said determiner is positive.

3. The videophone-capable television receiver according to claim 2, wherein said television broadcast program contains CMs on an intermittent basis, and said particular timing includes timing that belongs to a time period of television broadcasting the CMs.

4. The videophone-capable television receiver according to claim 2, wherein one of a plurality of television broadcast programs offered through a plurality of channels, respectively, is received by said television program reception function, and said particular timing includes timing in which a channel change operation is performed.

5. The videophone-capable television receiver according to claim 4, wherein said particular timing further includes timing in which length of time during which the same channel is continuously selected has reached a threshold value.

6. The videophone-capable television receiver according to claim 1, wherein, upon reception of the new e-mail, said determiner makes a determination.

7. The videophone-capable television receiver according to claim 1, wherein, upon acceptance of an ON operation of turning on said television program reception function, said determiner makes a determination.

8. The videophone-capable television receiver according to claim 1, further comprising a second permitter that, upon acceptance of an OFF operation of turning off said television program reception function, permits said message outputter to perform an output operation regardless of the result of determination by said determiner.

9. The videophone-capable television receiver according to claim 1, further comprising a storage that stores information on characteristics of a plurality of persons as candidates for the addressee, wherein said determiner includes an extractor that extracts information on characteristics of the viewer, and an identifier that identifies the viewer by a comparison between the characteristics information stored in said storage and the characteristics information extracted by said extractor.

10. The videophone-capable television receiver according to claim 1, wherein the determiner determines the viewer by personal voice data and/or personal image data of the viewer.

11. The videophone-capable television receiver according to claim 10, further comprising
a registerer to register a voice and/or an image of the user, and
a person database to store the personal voice data and/or personal image data as reference data.

12. A videophone-capable television receiver with a television program reception function of receiving a television broadcast program and a mail reception function of receiving an e-mail, comprising:
a message outputter which outputs a message when there exists an unopened e-mail that is received by said mail reception function and is not yet opened;
an inputter that inputs at least one of a voice and an image of a viewer of the television broadcast program received by said television program reception function; wherein the inputter comprises a microphone for sending a videophone speech and a camera for sending a videophone image;
a determiner which determines, based on at least one of the voice and the image of the viewer input by said inputter, whether or not the viewer matches an addressee of said unopened e-mail; wherein said determiner includes
a storage that stores information on characteristics of a plurality of persons as candidates for the addressee,
an extractor that extracts information on characteristics of the viewer, and
an identifier that identifies the viewer by a comparison between the characteristics information stored in said storage and the characteristics information extracted by said extractor; and
a prohibitor which prohibits said message outputter from performing an output operation at any time when a result of determination by said determiner is negative, while prohibiting said message outputter from performing an output operation at a time that hinders said addressee from viewing the television broadcast program received by said television program reception function, when a result of determination by said determiner is positive.

* * * * *